(12) United States Patent
Discher

(10) Patent No.: US 7,055,779 B1
(45) Date of Patent: Jun. 6, 2006

(54) DETACHABLE SKIS FOR AIRCRAFT

(76) Inventor: Richard A. Discher, E5880 Little River Rd., Weyauwega, WI (US) 54983

( * ) Notice: Subject to any disclaimer, the term of this patent is extended or adjusted under 35 U.S.C. 154(b) by 0 days.

(21) Appl. No.: 11/081,403

(22) Filed: Mar. 17, 2005

(51) Int. Cl.
*B64C 25/52* (2006.01)

(52) U.S. Cl. ............................ 244/108; 180/183; 280/9

(58) Field of Classification Search ............... 244/108, 244/105; 114/283; 180/180–183, 194–196; 280/7.12, 7.14, 8–11, 13
See application file for complete search history.

(56) References Cited

U.S. PATENT DOCUMENTS

| | | | | |
|---|---|---|---|---|
| 1,811,152 A | * | 6/1931 | Procofieff-Seversky | 244/100 R |
| 2,106,934 A | * | 2/1938 | Saulnier | 244/108 |
| 2,532,610 A | * | 12/1950 | Ditter | 244/108 |
| 2,539,817 A | * | 1/1951 | Ditter | 244/108 |
| 2,650,048 A | * | 8/1953 | Woychik | 244/108 |
| 2,718,367 A | * | 9/1955 | Doolittle | 244/105 |
| 2,733,026 A | * | 1/1956 | Ditter | 244/108 |
| 2,925,970 A | | 2/1960 | Heaslip | |
| 2,977,073 A | | 3/1961 | Ditter | |
| 3,117,845 A | * | 1/1964 | Reed | 244/108 |
| 3,790,109 A | | 2/1974 | Fischer | |
| 4,390,151 A | * | 6/1983 | Schneider | 244/108 |
| 5,599,030 A | | 2/1997 | Campbell | |

* cited by examiner

*Primary Examiner*—Galen Barefoot
(74) *Attorney, Agent, or Firm*—Russell L. Johnson, Patent Agent

(57) ABSTRACT

A wheel-through ski for the landing gear of an aircraft is disclosed. The ski has an airfoil shape, and the ski and its attachments are aerodynamically clean. The ski is provided with a three sided recess that permits the mounting of the ski on the aircraft without lifting the landing gear off the ground. The members of the articulated attachment between the ski and the aircraft are joined by a removable pin and are fixedly attached to the ski and landing gear. The ski is of aircraft construction. It has a thin skin, air frame-like internal structures, foam material internal cores that provide stiffness to the ski and wear strips on the bottom of the ski.

3 Claims, 4 Drawing Sheets

DETACHABLE SKIS FOR AIRCRAFT

BACKGROUND OF THE INVENTION

1. Field of the Invention

This invention relates to snow skis for fixed landing gear aircraft.

More particularly, this invention relates to skis for aircraft as described above that are readily attached to and removed from the landing gear of an aircraft.

Still more particularly, this invention relates to skis for aircraft as described above wherein the wheel of the aircraft landing gear projects through the ski enabling the aircraft to land on and take off from paved runways as well as snow and ice landing strips.

Skis for aircraft have a long history. Skis or skids were the landing gear of the Wright brother's first aircraft. Skis mounted to the landing gear of aircraft have permitted aircraft to land and take off from surfaces where wheeled landing gear would not serve.

In order to enable aircraft to land on a bare surface, and to land on an ice or snow covered surface, wheel-through skis were developed. Early "wheel-through ski" landing gear involved the raising of the landing gear off of the ground so that the wheel could be passed through a wheel port in the center of the ski. It is an object of this invention to provide a wheel-through ski that can be attached to and removed from the landing gear of an aircraft without raising the wheel of the aircraft.

Prior art skis for aircraft have been of irregular shape and have had mechanisms of attachment and control that created air drag and the potential for collecting ice and becoming a further drag on the aircraft in the air. It is an object of this invention to provide skis for aircraft that have a single hinged fixed position attachment to the landing gear. Further, it is an object of this invention to provide a ski for aircraft wherein the ski has an airfoil longitudinal profile and the ski attachment means is aerodynamically clean to minimize chances of air drag and/or the collecting of ice on the ski-landing-gear assembly adversely affecting the flight characteristics of the aircraft to which it is attached Light aircraft do not have wheels that can be turned for steering. When taxiing, the aircraft is steered by means of air control surfaces such as the ailerons and rudder and by braking one wheel. Long thin skis tend to "track" in snow and resist turning so that at slow taxiing speeds the aircraft is difficult to turn. It is an object of this invention to provide a ski for aircraft that is proportionately shorter and wider than conventional skis. A length to width ratio of 4:1 or less provides a ski that has a large area of contact with the snow, a large air foil surface and greater ease of turning at slow speeds and the wheel projection through the ski provides a braking means and a pivot to assist in turning.

When skis mounted on fixed landing gear aircraft have irregularities of their shape and/or the shape of their attachment means, the skis tend to "drag" on the aircraft in flight and to adversely affect the flight characteristics of the aircraft. It is an object of this invention to provide a ski for aircraft that does not appreciably affect the performance of the aircraft in the air and which does positively affect the stall speed of the aircraft during landing.

Conventional aircraft skis are structurally similar to snow skis for downhill skiing in that the load of the rider is transferred to a small area of the middle of the ski. The load is then sustained by the stiffness of the ski bearing down on the snow surface over the length of the ski. The stiffness of the ski is achieved by using metal or composites of natural and synthetic materials that are strong, light weight and durable. It is an object of this invention to provide a ski for aircraft that has a relatively thin skin, an airfoil shape and internal air craft structures that transfer the weight of the aircraft over a wide area of the bottom of the ski. To deal with the wear on the contact surface of the ski of this invention, the inventor provides wear strips of high lubricity, and toughness, detachably secured to the bottom of the ski.

Prior art skis are commonly attached to the landing gear of aircraft by modifying or attaching to the axle of the landing gear wheel. A long ski attached to the axle of the aircraft has the potential of imposing twisting loads of significant magnitude transverse to the axle, that the axle is not designed to accommodate. To deal with this potential, that inventor provides his ski with a small transition piece secured directly to the strut of the landing gear and having a pivot member with an axis of rotation parallel to the axis of rotation of the wheel.

Other objects will be made apparent from the following specifications and from the appended drawings and claims.

2. Brief Discussion of the Prior Art

Prior art skis known to the inventor suffer from one or more of the problems disclosed above and for which this invention provides a solution. Similarly the closest prior art known to the inventor possess one or more of the virtues of this invention.

U.S. Pat. No. 2,925,970 to Heaslip and U.S. Pat. No. 2,977,072 to Ditter et al. teach retractable wheel-through skis wherein the ski is wider forward of the wheel than it is rearward of the wheel thereby providing a two sided notch in the ski into which the wheel can be raised and lowered.

U.S. Pat. No. 3,790,109 to Fischer teaches a steel extension bolted to strut of the landing gear to replace the wheel and axle of the aircraft. Fischer also teaches an aerodynamic shape to reduce air drag.

U.S. Pat. No. 5,599,030 to Campbell et al. teaches detachable wear rods for skis.

BRIEF DESCRIPTION OF THE INVENTION

The invention in its simplest form is a wheel-through ski for the landing gear of an aircraft comprising: a ski having a top, a bottom, two sides and a front end and a back end and having a longitudinal profile in the shape of an airfoil, a wheel receiving recess having three sides, is located in the mid-span of the ski and the recess is open to one side of the ski, a first pivot member that is rigidly secured to the ski and the pivot member is located to the side of the recess above the top of the ski and having a pivot axis parallel to the top surface of the ski and transverse to the longitudinal centerline of the ski, a second pivot member rigidly secured to the landing gear of an aircraft and having a pivot axis parallel to the rotational axis of a wheel that is a part of the landing gear. A pivot pin is secured in the first and second pivot members along their pivot axes to form a fixed position articulated pivot joint that positions the wheel of the aircraft in the recess so that a portion of the wheel projects below the ski.

The structure of the ski is one wherein the ski is provided with a relatively thin outer skin formed of aircraft fabrication material, a rigid frame of light weight aircraft construction material disposed within the ski and the first pivot member is a part of the frame and the pivot member projects through the top of the ski and the frame defines a broad plane that is coextensive with the central portion of the bottom of the ski, and the portions of the ends of the ski not supported by the frame are cored with a rigid foam material that serves to maintain shape of the ski, and wherein the bottom of the ski is provided with longitudinal wear strips detachably secured to the bottom of the ski.

DETAILED DESCRIPTION OF THE INVENTION

Figure 1:
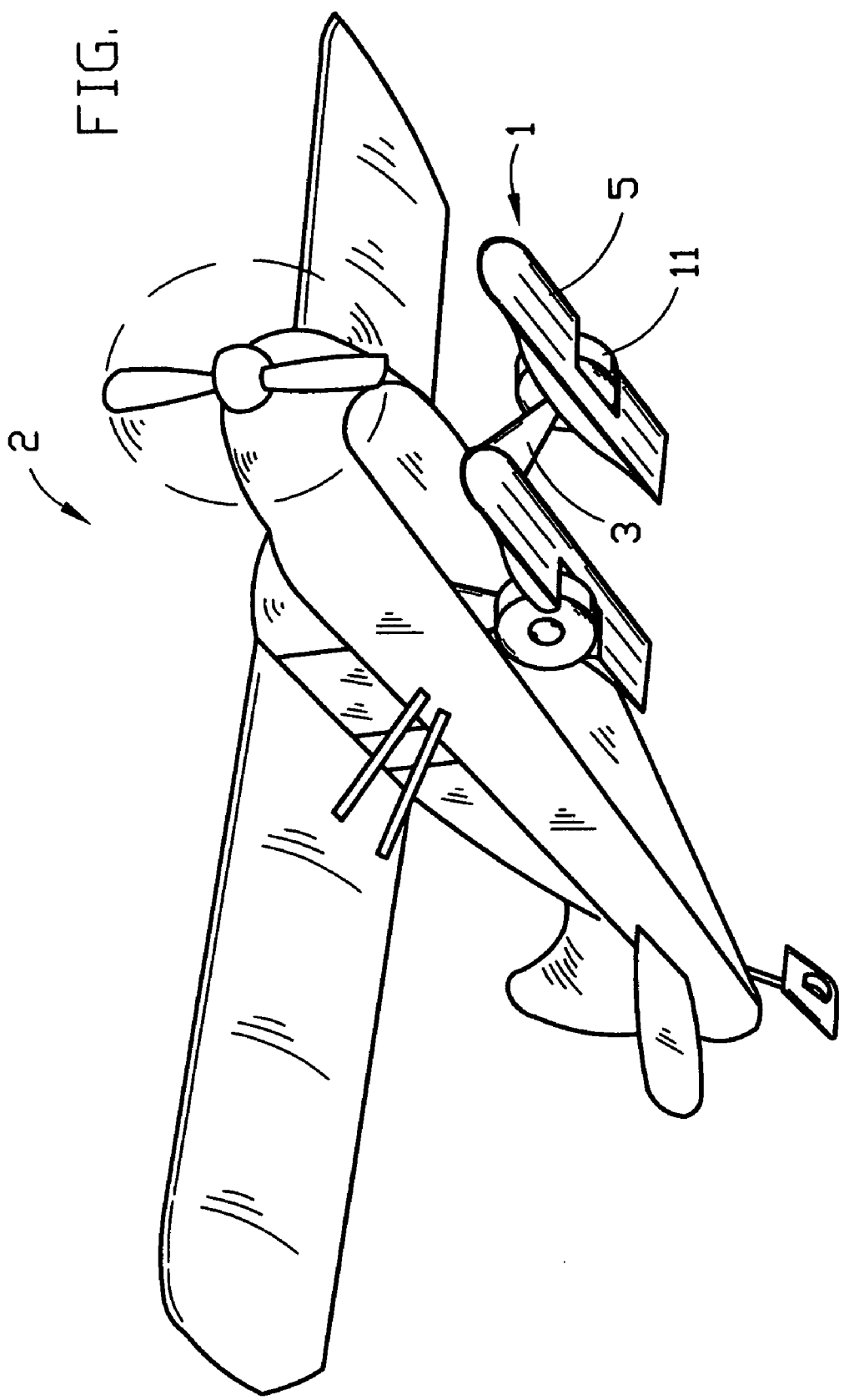
FIG. 1 is a pictorial view of the skis of this invention mounted on an aircraft
Figure 2:
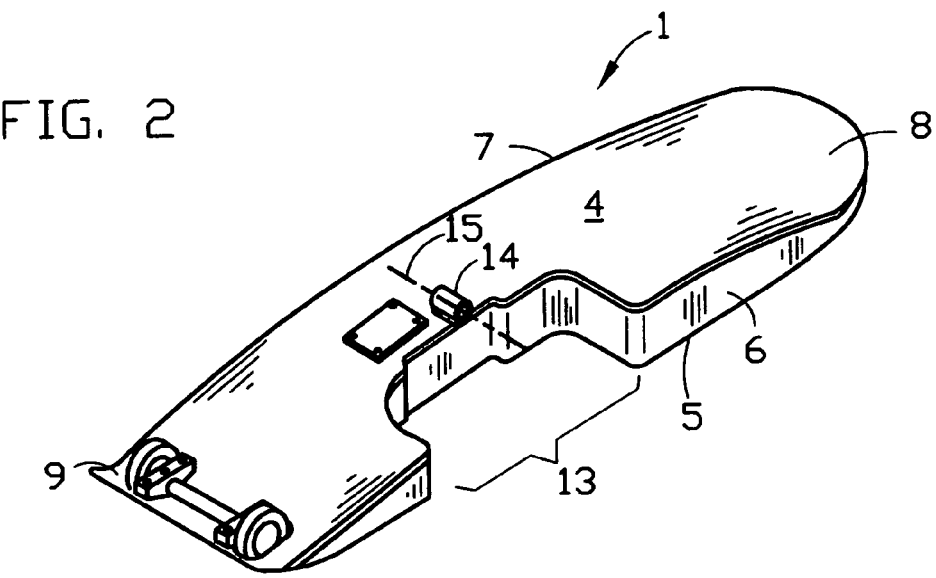
FIG. 2 is a pictorial view of the ski of this invention showing the shape of the ski and wheel recess and the position of the first pivot member of the ski mounting means.
Figure 3:
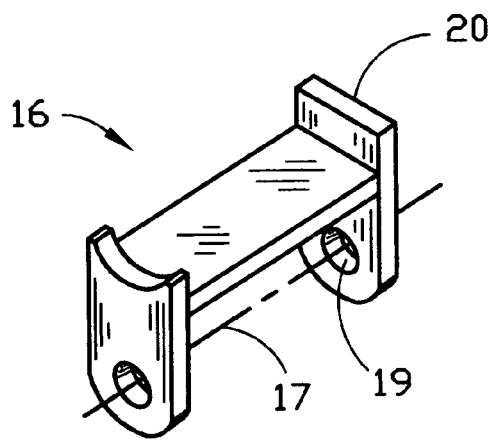
FIG. 3 is a pictorial view of the second pivot member of the ski mounting means.
Figure 4:
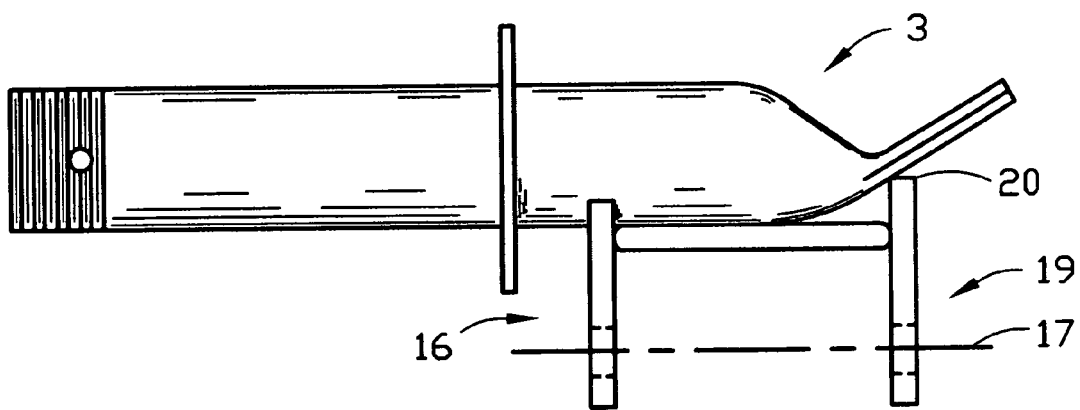
FIG. 4 is an elevation view showing the second pivot member welded to the strut of an aircraft landing gear.
Figure 5:
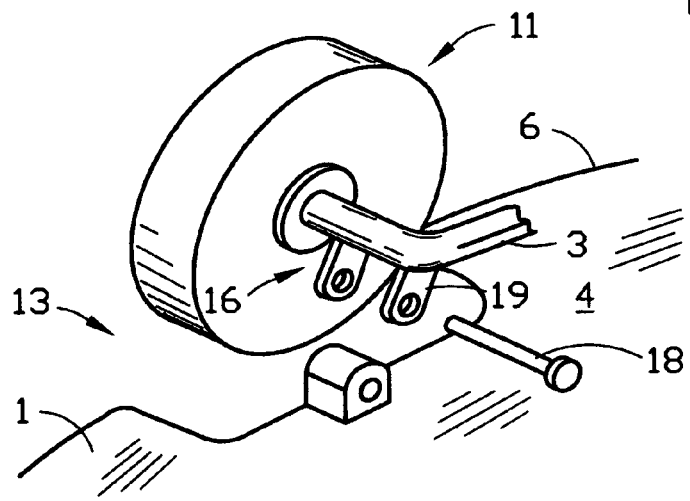
FIG. 5 is a fragmentary view of the ski of this invention showing the attachment pivot assembly for attaching the ski to the strut of the landing gear of an aircraft.
Figure 6:
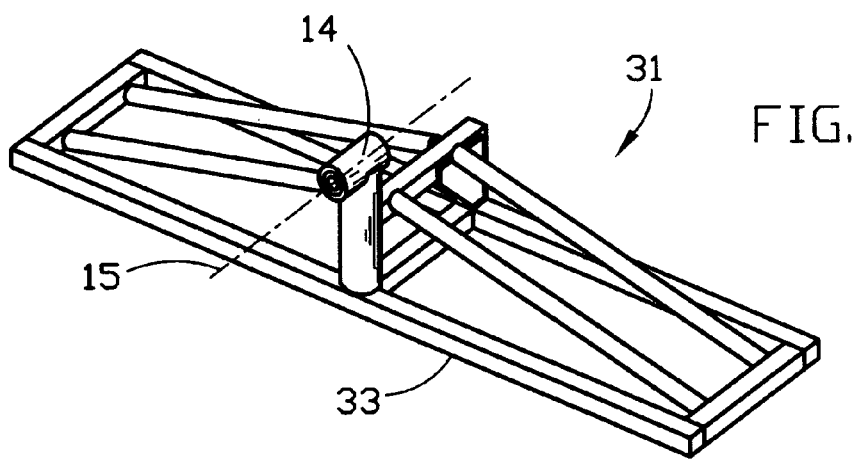
FIG. 6 is a pictorial view of the support frame for the ski of this invention
Figure 7:
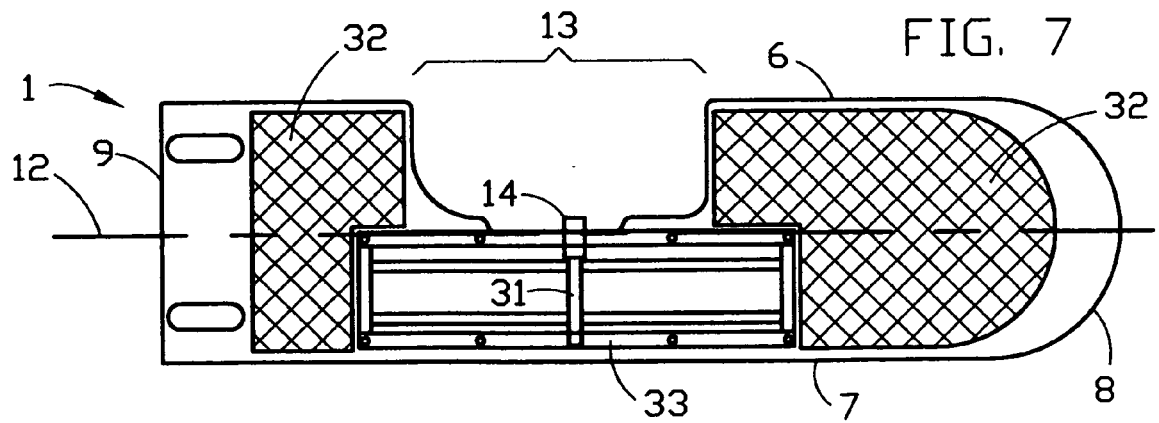
FIG. 7 is a schematic top plan view of the ski of this invention showing the positioning of the components of the ski.
Figure 8:
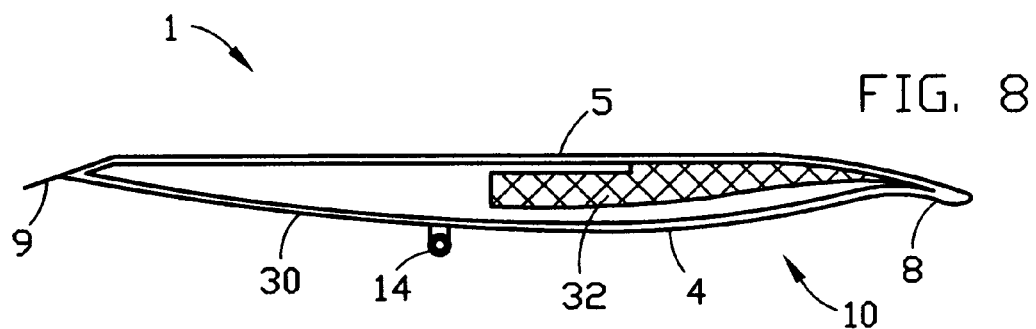
FIG. 8 is a first side elevation of the ski of this invention showing the positioning of the components of the ski.
Figure 9:
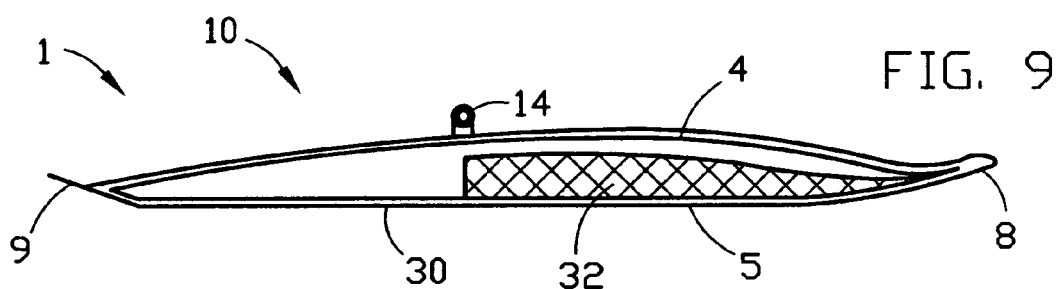
FIG. 9 is a second side elevation of the ski of this invention showing the positioning of the components of the ski.

In the drawings like numbers refer to like objects and the proportions of some parts of the drawings have been modified to facilitate illustration.

The term "aerodynamically clean" as used herein shall be read to mean "facilitates air flow around and through the subject structure and does not add appreciable drag to the aircraft or adversely affect the flight characteristics of the aircraft."

The wheel-through ski for aircraft of this invention is of light weight stiff construction and has a longitudinal profile of an airfoil and has a recess open to one side to permit the attaching of the ski to the landing gear of an aircraft without raising the wheel of the landing craft off the ground. The attachment means of this invention has a first pivot member projecting above the ski and a second aerodynamically clean pivot member permanently attached to the landing gear of the aircraft. The ski is attached to the landing gear of the aircraft by inserting a removable pivot pin through the first and second pivot members to form a pivot joint with its pivot axis transverse to the longitudinal axis of the ski. When the ski is in position on the landing gear the wheel resides in the recess and projects below the bottom of the ski. Essential components of the ski such as tail wheels, guy attachments, and the like are germane to this invention in that they are designed to be aerodynamically clean and are shown in the drawings but will not be discussed further herein.

Referring now to FIGS. 1 through 5, in which the ski of this invention and a means for attaching the ski to the wheel strut of the landing gear of an airplane is illustrated. Aircraft 2 has landing gear 3 having mounted thereon wheel-through ski 1. Ski 1 has a top surface 4 and a bottom surface 5, a first side surface 6 and a second side surface 7, a front end 8 and a back end 9, and a longitudinal centerline 12 and ski 1 has a longitudinal profile 10 in the shape of an airfoil. Wheel receiving recess 13 has three sides and is located in the midspan of ski 1 and is open to one side of the ski 1.

A first pivot member 14 is rigidly secured in ski 1 and is located to one side of recess 13 and above top surface 4 of ski 1 and has a pivot axis 15 parallel to top surface 4 of ski 1 and transverse to the longitudinal centerline 12 of ski 1.

Second pivot member 16 is rigidly secured to landing gear 3 of aircraft 2 and has a pivot axis 17 that is parallel to the rotational axis of wheel 111 of landing gear 3. A pivot pin 18 joins first pivot member 14 and second pivot member 16 along their pivot axes to form a fixed position articulated pivot joint that positions wheel 11 of aircraft 2 in recess 13 so that a portion of wheel 111 projects below the bottom surface 5 of ski 1.

The second pivot member 16 is aerodynamically clean and has a pivot portion 19 configured to receive first pivot member 14 and pivot pin 18 and an attachment portion 20 configured to be attached to the landing gear of an aircraft. Attachment portion 20 of pivot member 16 can be readily and economically configured so that pivot member 16 can be fixedly and rigidly attached to aircraft landing gear of various configurations.

Pivot member 16 is intended to be permanently attached to landing gear 3 as by welding so that pivot axis 17 is parallel to the rotational axis of wheel 11. Ski 1 can then be attached to landing gear 3 by bringing pivot axis 15 into alignment with pivot axis 17 and inserting pivot pin 18 through aligned pivot members 14 and 16.

The attachment of guys and safety attachments completes the assembly in a few minutes and without disturbing the position of the aircraft and without the need for elaborate tooling or connectors. In assembly the ski is positioned around three sides of the wheel with the wheel projecting below the bottom of the ski. The assembly is aerodynamically clean and adds little drag on the aircraft in flight. The airfoil shape of the ski provides lift to the aircraft and does not have any appreciable effect on the air speed or handling characteristics of the aircraft in the air with the exception that it enables the aircraft to land and take off at lower speeds.

A combination of the length to width ratio of 4:1 or less of the ski and the projection of the wheel through the ski, facilitates the turning of the aircraft when taxiing at low speeds.

The above disclosures are enabling and would permit one skilled in the art to make and use the ski of this invention without undue experimentation. To meet the inventor's obligation to disclose the best mode of practicing the invention, the inventor will disclose details of the construction of ski 3.

Ski 1 employs the materials and fabrication technologies of aircraft wing construction. Referring now to FIGS. 6 through 10 wherein the fabrication details of ski 1 are shown. Ski 1 is provided with a relatively thin skin 30 made of light weight and strong aircraft construction material such as aluminum alloy, fiberglass, or composite cloth. A pedestal support frame 31 is formed of air frame materials such as light weight tubular metal members welded to form rigid frame 31 which is disposed within ski 1 and first pivot member 14 is a part of frame 31. Pivot member 14 projects through the top surface 4 of ski 1. The bottom 33 of frame 31 defines a broad plane that is coextensive with the central portion of the bottom 5 of ski 1. The portions of ski 1 not supported by frame 31 are cored with a rigid foam material 32 that serves to maintain the shape of ski 1 and give it additional stiffness.

Figure 10:
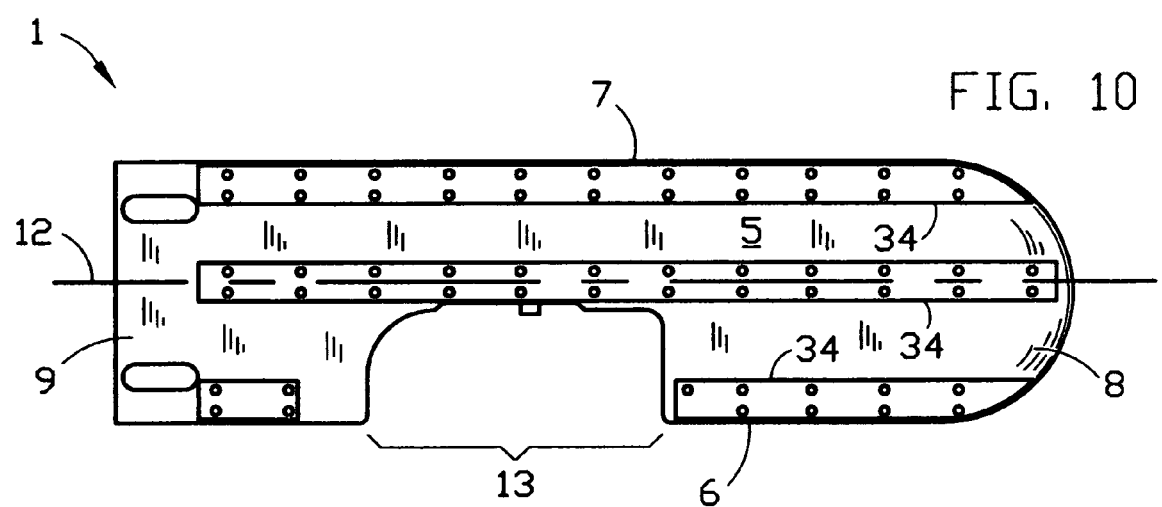
FIG. 10 is a bottom plan view showing the positioning of the components of the ski.

Wear of skin 30 on the bottom surface 5 of ski 1 is a concern. As shown in FIG. 10, ski 1 is provided with longitudinal wear strips 34 positioned parallel to the longitudinal axis of ski 1 and made of tough material such as magnesium alloy or steel, or a high lubricity tough plastic such as UHMW polyethylene. Wear strips 34 are detachable to permit the repair and/or replacement of wear strips 34.

The applicant has provided in his specifications and drawings, enabling disclosures of his invention and the best mode of practicing it. It should be understood that there are numerous variants of the ski of this invention that would be made obvious by the above disclosures that would be within the scope of the appended claims. Therefore it should be understood that the scope of this invention should not be limited to the scope of the embodiments disclosed above but that the scope of this invention should only be limited by the scope of the appended claims and all equivalents thereto that would be made obvious thereby.

What is claimed is:

1. A wheel-through ski for the landing gear of an aircraft comprising:
    a) a ski having a top surface, a bottom surface, a first side, a second side, a front end and a back end, a longitudinal center line, and having a longitudinal profile in the shape of an airfoil,
    b) a wheel receiving recess having three sides, and located in the mid-span of the ski and the recess is open to one side of the ski,
    c) a first pivot member is rigidly secured to the ski and the pivot member is located to the side of the recess and above the top surface of the ski and has a pivot axis parallel to the top surface of the ski and transverse to the longitudinal centerline of the ski,
    d) a second pivot member rigidly secured to the landing gear of an aircraft and having a pivot axis parallel to the rotational axis of a wheel that is a part of the landing gear,
    e) a pivot pin secured in the first and second pivot members along their pivot axes to form a fixed position articulated pivot joint that positions the wheel of the aircraft in the recess of the ski so that a portion of the wheel projects below the bottom surface of the ski.

2. The ski of claim 1 wherein the ski is provided with a relatively thin outer skin formed of an aircraft fabrication material, a rigid frame of a light weight aircraft construction material disposed within the ski and the first pivot member is a part of the frame and the pivot member projects through the top of the ski and the frame defines a broad plane that is coextensive with the central portion of the bottom of the ski, and the portions of the ends of the ski not supported by the frame are cored with a rigid foam material that serves to maintain shape of the ski.

3. The ski of claim 2 wherein the bottom of the ski is provided with longitudinal wear strips detachably secured to the bottom of the ski.

* * * * *